(12) United States Patent
Kholidy et al.

(10) Patent No.: US 10,193,904 B2
(45) Date of Patent: Jan. 29, 2019

(54) DATA-DRIVEN SEMI-GLOBAL ALIGNMENT TECHNIQUE FOR MASQUERADE DETECTION IN STAND-ALONE AND CLOUD COMPUTING SYSTEMS

(71) Applicant: QATAR UNIVERSITY, Office of Academic Research, Doha (QA)

(72) Inventors: Hesham Abdelazim Ismail Mohamed Kholidy, Doha (QA); Abdulrahman Azab, Haugesund (NO); Fabrizio Baiardi, Pisa (IT)

(73) Assignee: QATAR UNIVERSITY, Doha (QA)

( * ) Notice: Subject to any disclaimer, the term of this patent is extended or adjusted under 35 U.S.C. 154(b) by 122 days.

(21) Appl. No.: 15/213,111

(22) Filed: Jul. 18, 2016

(65) Prior Publication Data

US 2017/0019419 A1    Jan. 19, 2017

Related U.S. Application Data

(60) Provisional application No. 62/193,532, filed on Jul. 16, 2015.

(51) Int. Cl.
*H04L 29/06* (2006.01)
*G06F 21/00* (2013.01)
*G06F 21/55* (2013.01)

(52) U.S. Cl.
CPC .......... *H04L 63/1416* (2013.01); *G06F 21/00* (2013.01); *G06F 21/552* (2013.01); *H04L 63/1425* (2013.01)

(58) Field of Classification Search
None
See application file for complete search history.

(56) References Cited

U.S. PATENT DOCUMENTS 6,088,449 A * 7/2000 Atalla ................ H04L 9/0838
380/273
6,694,045 B2 * 2/2004 Chung ............... G06K 7/10346
345/179

(Continued)

OTHER PUBLICATIONS

Coull, Scott and Szymanski, Boleslaw. Sequence Alignment for Masquerade Detection. Computational Statistics and Data Analysis 52 (2008) [online], Feb. 5, 2008, pp. 4116-4131. [retrieved on Mar. 1, 2018]. Retrieved from the internet:< URL: http: // www . sciencedirect . com >. (Year: 2008).*

(Continued)

*Primary Examiner* — Malcolm Cribbs
(74) *Attorney, Agent, or Firm* — Squire Patton Boggs (US) LLP

(57) ABSTRACT

Systems and methods are provided for intrusion detection, specifically, identifying masquerade attacks in large scale, multiuser systems, which improves the scoring systems over conventional masquerade detection systems by adopting distinct alignment parameters for each user. For example, the use of DDSGA may result in a masquerade intrusion detection hit ratio of approximately 88.4% with a small false positive rate of approximately 1.7%. DDSGA may also improve the masquerade intrusion detection hit ratio by about 21.9% over convention masquerade detection techniques and lower the Maxion-Townsend cost by approximately 22.5%. It will also improve the computational overhead.

17 Claims, 17 Drawing Sheets

(56) References Cited

U.S. PATENT DOCUMENTS

| | | | | |
|---|---|---|---|---|
| 9,058,355 | B1* | 6/2015 | Kulkarni | G06F 17/30424 |
| 2006/0107321 | A1* | 5/2006 | Tzadikario | H04L 63/0227 |
| | | | | 726/22 |
| 2008/0271147 | A1* | 10/2008 | Mohanan | G06F 21/552 |
| | | | | 726/24 |
| 2015/0016431 | A1* | 1/2015 | Ranta-Aho | H04W 72/0406 |
| | | | | 370/336 |
| 2015/0317475 | A1* | 11/2015 | Aguayo Gonzalez | G06F 21/55 |
| | | | | 726/23 |

OTHER PUBLICATIONS

Razo-Zapata, Ivan; Mex-Perera, Carlos and Monroy, Raul. Masquerade Attacks Based on User's Profile. The Journal of Systems and Software [online], Jun. 13, 2002, pp. 2640-2651. [retrieved on Mar. 1, 2018]. Retrieved from the Internet< URL : http: // www. elsevier. com /locate /jss >. (Year: 2012).*

* cited by examiner

Test sequence: AWGHE
Signature sequence: AW - HE

|  | Test Seq. | A | W | G | H | E |
|---|---|---|---|---|---|---|
| Sign-ature Seq. | 0 | 0 | 0 | 0 | 0 | 0 |
| P | 0 | 0 | 0 | 0 | 0 | 0 |
| A | 0 | 5 | 0 | 0 | 0 | 0 |
| W | 0 | 0 | 20 | 12 | 4 | 0 |
| H | 0 | 0 | 12 | 18 | 22 | 14 |
| E | 0 | 0 | 4 | 10 | 18 | 28 |

*Test Sequence*

|  |  | A | W | G | H | E |
|---|---|---|---|---|---|---|
|  | 0 | 0 | 0 | 0 | 0 | 0 |
| P | 0 | !M | !M | !M | !M | !M |
| A | 0 | M | !M | !M | !M | !M |
| W | 0 | !M | M | GS | GS | !M |
| H | 0 | !M | GT | !M | M | GS |
| E | 0 | !M | GT | GT | !M | M |

*Signature Sequence*

FIG. 7

User's session patterns with length = 10 (Test Sequence)

| B | A | C | A | A | B | D | E | F | E |
|---|---|---|---|---|---|---|---|---|---|

User's signature patterns with length = 68 (Signature Sequence)

| F | C | Y | D | D | B | A | E | F | F | K | E | C | B | G | F | A | V | E | F | M | G | I | C |
|---|---|---|---|---|---|---|---|---|---|---|---|---|---|---|---|---|---|---|---|---|---|---|---|
| H | H | N | D | F | R | C | A | A | B | V | F | E | C | G | G | H | K | Z | F | E | C | A | I |
| C | A | P | C | D | E | F | F | M | A | C | D | E | F | D | P | R | E | B | A |   |   |   |   |

| No. | The Overlapped Subsequences | | | | | | | | | | Match |
|---|---|---|---|---|---|---|---|---|---|---|---|
| 1: | F | C | Y | D | D | B | A | E | F | F | K | E | C | B | 8 |
| 2: | D | B | A | E | F | F | K | E | C | B | G | F | A | V | 9 |
| 3: | F | F | K | E | C | B | G | F | A | V | E | F | M | G | 6 |
| 4: | C | B | G | F | A | V | E | F | M | G | I | C | H | H | 5 |
| 5: | A | V | E | F | M | G | I | C | H | H | N | D | F | R | 5 |
| 6: | M | G | I | C | H | H | N | D | F | R | C | A | A | B | 6 |
| 7: | H | H | N | D | F | R | C | A | A | B | V | F | E | C | 7 |
| 8: | F | R | C | A | A | B | V | F | E | C | G | G | H | K | 6 |
| 9: | A | B | V | F | E | C | G | G | H | K | Z | F | E | C | 6 |
| 10: | E | C | G | G | H | K | Z | F | E | C | A | I | C | A | 6 |
| 11: | H | K | Z | F | E | C | A | I | C | A | P | C | D | E | 7 |
| 12: | E | C | A | I | C | A | P | C | D | E | F | F | M | A | 7 |
| 13: | C | A | P | C | D | E | F | F | M | A | C | D | E | F | 7 |
| 14: | D | E | F | F | M | A | C | D | E | F | D | P | R | E | 6 |
| 15: | M | A | C | D | E | F | D | P | R | E | B | G | | | 9 |

The top match Subsequences

FIG. 9

DATA-DRIVEN SEMI-GLOBAL ALIGNMENT TECHNIQUE FOR MASQUERADE DETECTION IN STAND-ALONE AND CLOUD COMPUTING SYSTEMS

CROSS REFERENCE TO RELATED APPLICATIONS

This application is related to and claims the benefit and priority of U.S. Provisional Application No. 62/193,532 filed Jul. 16, 2015, the entirety of which is incorporated herein by reference.

FIELD OF THE INVENTION

The present invention relates to systems and methods for intrusion detection, and more specifically, to systems and methods for improving the accuracy of the behavior based intrusion detection in an information system by using distinct alignment parameters for each user of the information system.

BACKGROUND OF THE INVENTION

Intrusions on computer infrastructures present growing problems for the computer and information system industry. One of the most damaging attacks or intrusion is masquerading, where an attacker assumes the identity of a legitimate user of a computer system. Masquerade attacks occur when an intruder obtains a legitimate user's login credentials by misappropriation, theft or other unscrupulous methods. It is difficult to detect this type of security breach, because the attacker appears to be a legitimate or normal user with valid authority and privileges. A masquerade attacker may be an insider, one who is an authorized user of the systems that misuses their privileges to access distinct accounts and perform unauthorized actions. A masquerade attacker may be an outsider, one who does not have authorized access to a system, but aims to utilize all of the privileges of an authorized user of the system. A masquerade attack may also be implemented with any convention hacking methods, including, but not limited to duplication or ex-filtration of an authorized user's password, installation of software with backdoors or malicious code, eavesdropping and packet sniffing, spoofing and social engineering attacks. A masquerade attack may also be implemented through phishing emails or email attachments Some of the attacks above may leave an audit trail in the target system's log files. Conventional masquerade detection systems can analyze these logs to detect the attacks. Attacks that do not leave an audit trail in the target system may be discovered by analyzing the user behaviors through masquerade detection. Conventional masquerade detection systems for detecting masquerade attacks, first, build a profile for each user of the system by gathering information such as login time, location, session duration, CPU time, commands issued, user ID and user IP address. These profiles may also take into account user interactions with a system, including, but not limited to, command line commands, system calls, mouse movements, opened files names, opened windows title, and network actions. These conventional masquerade detection systems then compare these profiles against logs and identify any behavior that does not match the profile as an attack. These conventional masquerade detection systems have a level of accuracy and performance practical for small scale deployments. Large scale computer systems experience difficulties attempting to distinguish between attackers and normal users with a high accuracy.

There is a need for an intrusion detection system for masquerade attacks that is accurate and has a level of performance, which is practical for large scale multi-user systems.

SUMMARY OF THE INVENTION

Embodiments of the present invention overcome the above-mentioned and other drawbacks by providing Data-Driven Semi-Global Alignment intrusion detection system and methods ("DDSGA") for masquerade attacks with improved scoring systems that adopt the distinct alignment parameters for each user of a system.

Embodiments of the present invention may include a system and method for an intrusion detection method for identifying masquerade attacks. The method may include: receiving data from at least one user with an active session on a system; receiving historical data for each of the at least one user; applying an algorithm to the received data to build at least one profile for each of the at least one user, wherein the at least one profile comprises one or more sample signatures; applying an algorithm to the received historical data to build at least one model for each of the at least one user, wherein said at least one model comprises one or more reference signatures; identifying a dynamic threshold; determining an alignment score between the sample signatures to the reference signatures by comparing first alignment parameters from the sample signatures with second alignment parameters from the reference signatures; determining an intrusion masquerade event based on the alignment score being greater than the identified dynamic threshold; and updating patterns for each of the at least one active user. The system may include a computer containing software (computer program code).

Another embodiment of the invention is to a non-transitory computer-readable medium upon which is embodied a sequence of programmable instructions which, when executed by a processor, cause the processor to perform an intrusion masquerade detection method comprising: receiving data from at least one user with an active session on a system; receiving historical data for each of the at least one user; applying an algorithm to the received data to build at least one profile for each of the at least one user, wherein the at least one profile comprises one or more sample signatures; applying an algorithm to the received historical data to build at least one model for each of the at least one user, wherein said at least one model comprises one or more reference sequences. This embodiment also includes identifying a dynamic threshold; determining an alignment score between the sample signatures to the references signatures by comparing first alignment parameters from the sample signatures with second alignment parameters from the reference signatures; determining an intrusion masquerade event based on the alignment score being greater than the identified dynamic threshold; and updating patterns for each of the at least one active user.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings:

FIG. 7 is an illustration of an exemplary transition and backward transition matrices according to one embodiment.

FIG. 9 is an illustration of an exemplary overlapped reference sequences according to one embodiment.

Figure 1:
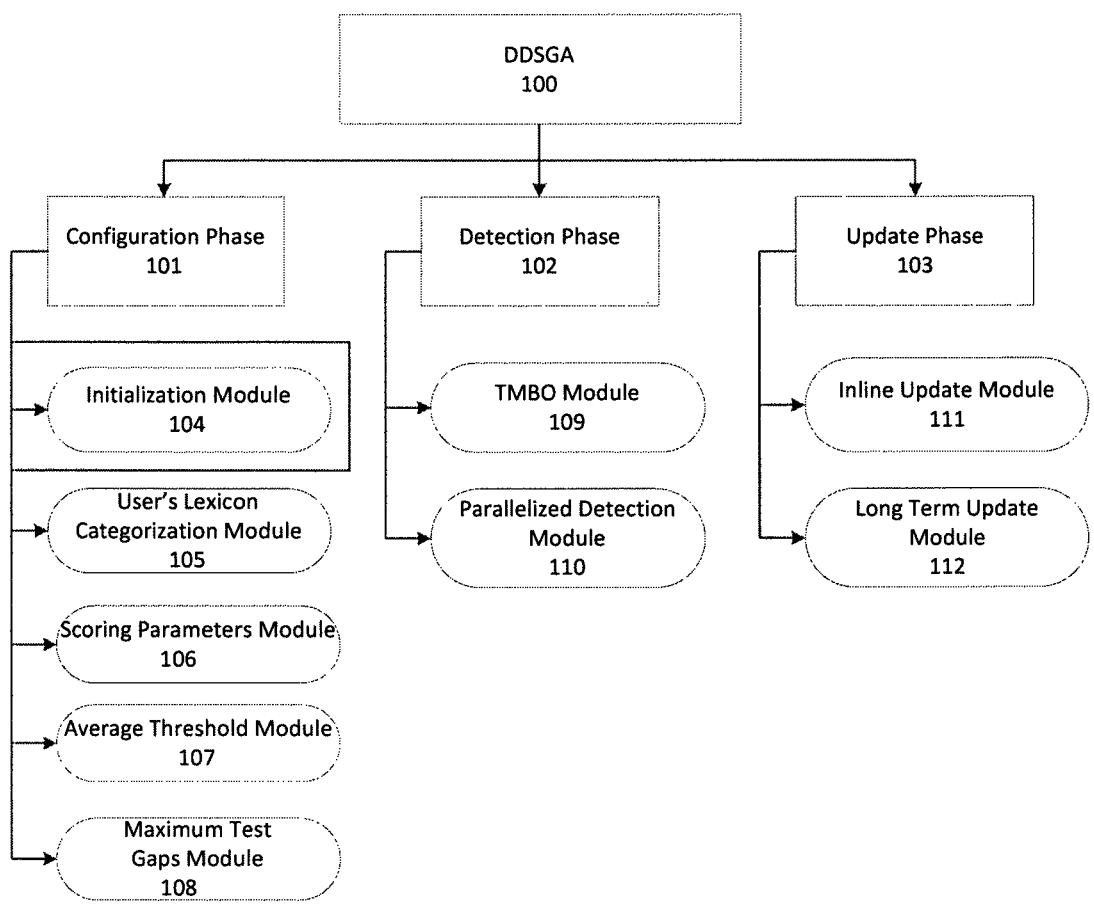
FIG. 1 is an illustration of the three phases of DDSGA.

In the following detailed description of the illustrative embodiments, reference is made to the accompanying drawings that form a part hereof. These embodiments are described in sufficient detail to enable those skilled in the art to practice the invention, and it is understood that other embodiments may be utilized and that logical or structural changes may be made to the invention without departing from the spirit or scope of this disclosure. To avoid detail not necessary to enable those skilled in the art to practice the embodiments described herein, the description may omit certain information known to those skilled in the art. The following detailed description is, therefore, not to be taken in a limiting sense.

DETAILED DESCRIPTION OF THE INVENTION

Embodiments of the present invention provide software and systems comprising software for an improved intrusion detection system and method. In particular, embodiments, DDSGA 100 provide improved accuracy and performance over conventional masquerade detection systems based on the Semi-Global Alignment (SGA) approach by adopting distinct alignment parameters for each user of a system. Limiting factors for intrusion detection systems include the associated error rate, in particular the false alarm rate, the demand for computational resources, and the execution time required. Although a single undetected intrusion can cause significant cost, false alarms require constant manual screening, thus generating a continual drain on personnel resources. Additionally, the occurrence of significant false positives reduces screening effectiveness, further aggravating the problem. Thus, embodiments can include masquerade intrusion detection systems and methods having a lower false positive rate than conventional masquerade detection systems, relatively low computational intensity and a higher hit ratio than conventional masquerade detection systems.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. A computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out methods of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

As used herein, a "database" may be a relational database, flat file database, relational database management system, object database management system, operational database, data warehouse, hyper media database, post-relational database, hybrid database models, RDF database, key value database, XML database, XML store, text file, flat file or other type of database.

As used herein, "authentication" refers to any authentication and access control mechanisms employed for granting access to computer systems, including but not limited to usernames, passwords, user identification number, biometric data, facial characteristics, voice, tokens or other objects from a single-sign-on (SSO) or identity server, two-factor authentication, multi-factor authentication or other conventional authentication mechanism.

As used herein, the term "real time" may include, but is not limited to, immediate, rapid, not requiring operator intervention, automatic, and/or programmed. Real time may include, but is not limited to, measurements in femtoseconds, picoseconds, nanoseconds, milliseconds, as well as longer, and optionally shorter, time intervals.

As used herein, the term "test sequence" or "sample sequence" are used interchangeably to refer to a "test sequence".

As used herein, the term "signature sequence" or "reference sequence" are used interchangeably to refer to a "signature sequence".

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

In a first embodiment, the DDSGA 100 may align a user's active session test sequence to the signature sequence of the same user and it may label the misalignment areas as anomalous. A masquerade attack may be signaled if the percentage of anomalous areas is larger than a dynamic, user dependent threshold. DDSGA 100 can tolerate small mutations in the user sequences with small changes in the low level representation of user commands. Referring to FIG. 1, in one embodiment, the DDSGA 100 may include several phases, such as, for example, a configuration phase 101, a detection phase 102 and an update phase 103. In some alternatives, the configuration phase 101 may include several modules such as, for example, an initialization module 104, a user's lexicon categorization module 105, a scoring parameters module 106, an average threshold module 107, and a maximum test-gaps module 108. The configuration phase 101 may compute, for each user, the alignment parameters to be used by both the detection and update phases. In some alternatives, the configuration phase 101 may compute scoring parameters that may result in the maximum alignment score for a particular user. In other words, a test sequence is generated in the configuration phase. To improve the accuracy of the alignment, DDSGA 100 may integrate conventional scoring systems, such as, for example binary and command group scoring systems with two other conventional scoring systems, such as, for example, restricted and free permutation. The resulting scoring system may tolerate permutations of previously observed patterns with a low reduction of the score. To tolerate changes in the low-level representation of commands with the same functionality, DDSGA 100 may classify user commands into several groups and may align several commands in the same group without reducing the alignment score. The DDSGA 100 configuration phase 101 may also create a dynamic threshold for each user to be used by, both the detection phase and the update phase. DDSGA 100 may build more sensitive and dynamic thresholds by considering any data in the profile.

In some alternatives, the detection phase 105 may include several modules such as, for example, a Top Matching Based Overlapping (TMBO) module 109 and a parallelized detection module. The detection phase 105 may also align the user's current session test sequence to the reference sequence. The computational performance of this phase may be improved by several conventional approaches, such as, for example the TMBO approach and the parallelized approach.

In some alternatives, the update phase 103 may include several modules, such as for example, an inline update module 111 and a long term update module 112. The inline module 111 may update the user signature patterns, the user lexicon list, and their corresponding command categories in a reconfiguration phase. The long-term module 112 may update the system with the latest changes in the alignment parameters. It may also update the dynamic threshold values, scoring parameters, and the overlapping length i.e., the length of the overlapped signature subsequence according to maximum number of inserted test gaps. The dynamic threshold, the scoring systems, and the two update modules may enable DDSGA 100 to tolerate slight changes in a user's behavior over time. In the update phase 103, DDSGA 100 may extend both the user signature and user lexicon list with the new patterns to reconfigure the system parameters, and alter the signature sequence.

In some embodiments, DDSGA 100 may improve the performance of both the computational and the security efficiency while reducing the number of false positives. During detection 102 and the update 103 phases, DDSGA 100 may produce these improvements through a parallel multithreading or multiprocess scheme and a TMBO approach that may improve the Heuristic Aligning and save computational resources. For example, while the Heuristic Aligning may split the reference sequence into a fixed overlapped subsequences of size 2n, where n is the size of the test sequence, TMBO may simplify the alignment through shorter overlapped sub-sequences. This may result in an increase in the speed of the detection phase 102 and update phase 103, and may consequently reduce the masquerader's live time inside the system.

In some embodiments, DDSGA 100 may improve the accuracy of masquerade detection, by providing distinct scoring parameters for each user, such as, for example, the gap penalties and the overlapping length. The adoption of distinct scoring parameters for each user may improve the detection accuracy, the false positive and false negative rates and may increase the detection hit ratio with respect to conventional masquerade detection systems.

Figure 2:
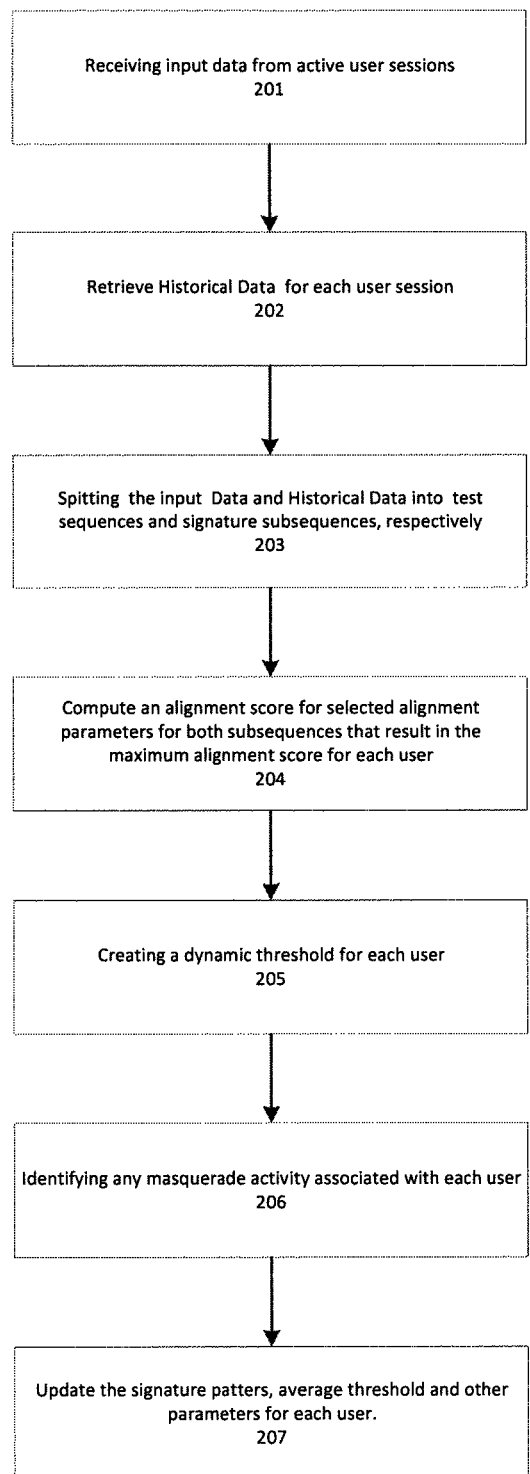
FIG. 2 is a flowchart illustrating an exemplary DDSGA process according to one embodiment.

Referring to FIG. 2, there is shown an illustration of a high level flow chart of an exemplary process for masquerade intrusion detection software according to one embodiment. In step 201, DDSGA 100 may build a profile for each user containing user lexicons and other user data associated with a user's active session. In some alternatives, the user data may include, but is not limited to the following types of data: user login information, login time, location, session duration, CPU time, commands issued, user ID and user IP address, command line commands, system calls, mouse movements, opened files names, opened windows title, and network actions. In some alternatives that may be used to evaluate masquerade detection, the user data may be taken from any conventional data set such as, for example, SEA, Greenberg, Purdue, RUU, and CIDD (Cloud Intrusion Detection Dataset).

In some alternatives, the user's lexicon categorization module 105 may build a lexicon for each active user on the system. The lexicon may include a list of lexical patterns classified according to their functionality. The lexicon may be used to tolerate changes in the low level representation of a pattern. In the exemplary SEA dataset illustrated in Table 1 below, these patterns may be UNIX commands. The lexicon categorization module 105 may classify user commands into several categories according to their functionalities. For example as illustrated in Table 2 below, a user can use either cat or vi to write a file, the user's lexicon categorization module 105 may align the two commands because both belong to the same group, "Text processing". In another example, the user's lexicon categorization module 105 may align grep with find because they both belong to the same group, "searching". In some alternatives, the profile may contain one or more sequence of commands from a user's lexicon, which may be referred to as test sequences.

TABLE 1

Sample SEA User1 Lexicon List

| User's Lexicon List | Functional Group |
| --- | --- |
| cat | File system, Text processing |
| vi | Text processing |
| Sh | Shell environment |
| env | User environment |
| kill | Process Management |
| reaper | Networking |
| mail | Internet Applications |
| hostname | System Information |
| nawk | Development, Shell Programming |
| getop | Development, Shell Programming |
| grep | Searching, Text Processin |
| find | Searching |

In step 202, DDSGA 100 may retrieve historical audit data for each active user on the system. In some alternatives, the historical audit data may be obtained by one source, such as for example, an audit database. In some alternatives, the historical audit data may be provided by multiple sources. In some alternatives, the DDSGA 100 may build at least one reference model for each active user from historical audit data using any conventional algorithm. The model may contain one or more one or more sequences of historical commands from each active user's prior sessions, which are referred to as signature sequences.

Figure 3:
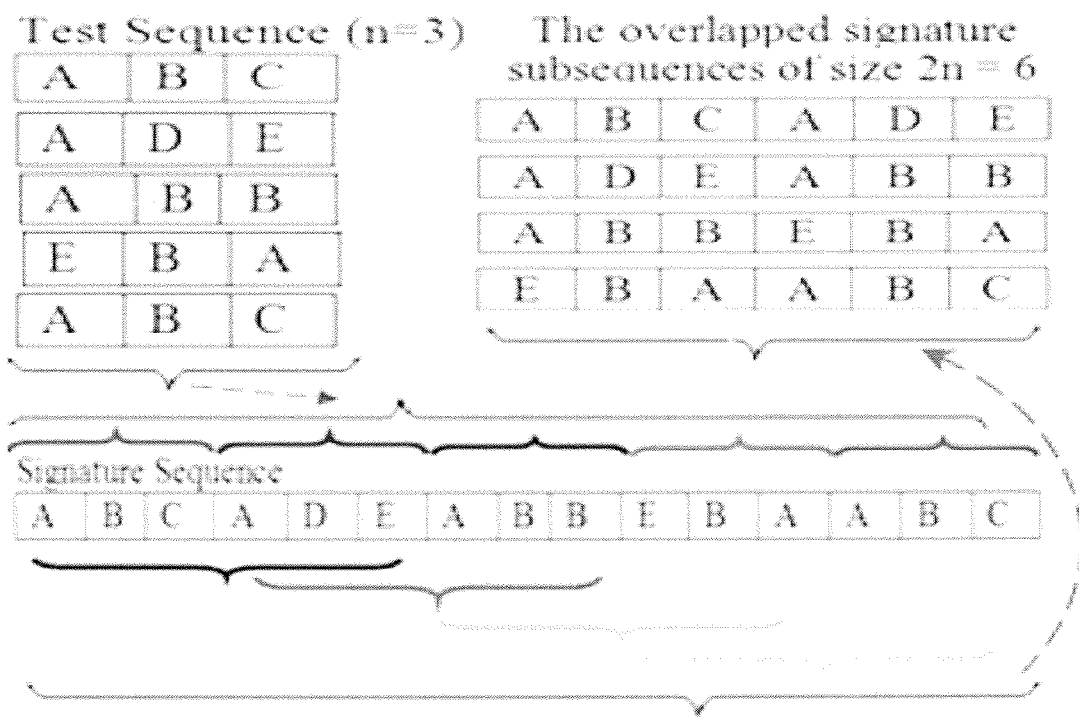
FIG. 3 is an illustration of exemplary non-overlapped sample sequences and the overlapped reference subsequences configuration according to one embodiment.

In step 203, the DDSGA 100 initialization module 104 may partition the current sample sequences and reference sequences for each user into nt non-overlapped-blocks each of length n and use them as sample sequences to the user. These sequences may represent all given combinations for each active user's reference sequences. To define the reference sequences, DDSGA 100 may divide the user reference sequence into a set of overlapped groups of length m=n+m. In this way, the last m symbols of a block may also appear as the first m of the next one. ns, the number of signature subsequences may be equal to nt−1 groups to account for all possible adjacent pairs of the reference sequences of size n. For example, DDSGA 100 may select a length of 2n to overlap with the reference sequence because any particular alignment may use subsequences with a length that is, at most, 2n. A longer subsequence may score poorly because of the number of gaps, which may be inserted. In fact, because the scoring alignment depends upon the match between the test and the signature subsequences, the former may be shorter than the latter. As a consequence, the reference sequence for this phase consists of 2n commands produced by overlapping the reference sequence. Hence, there may be nt−1 groups that are created as illustrated in FIG. 3.

Figure 5:
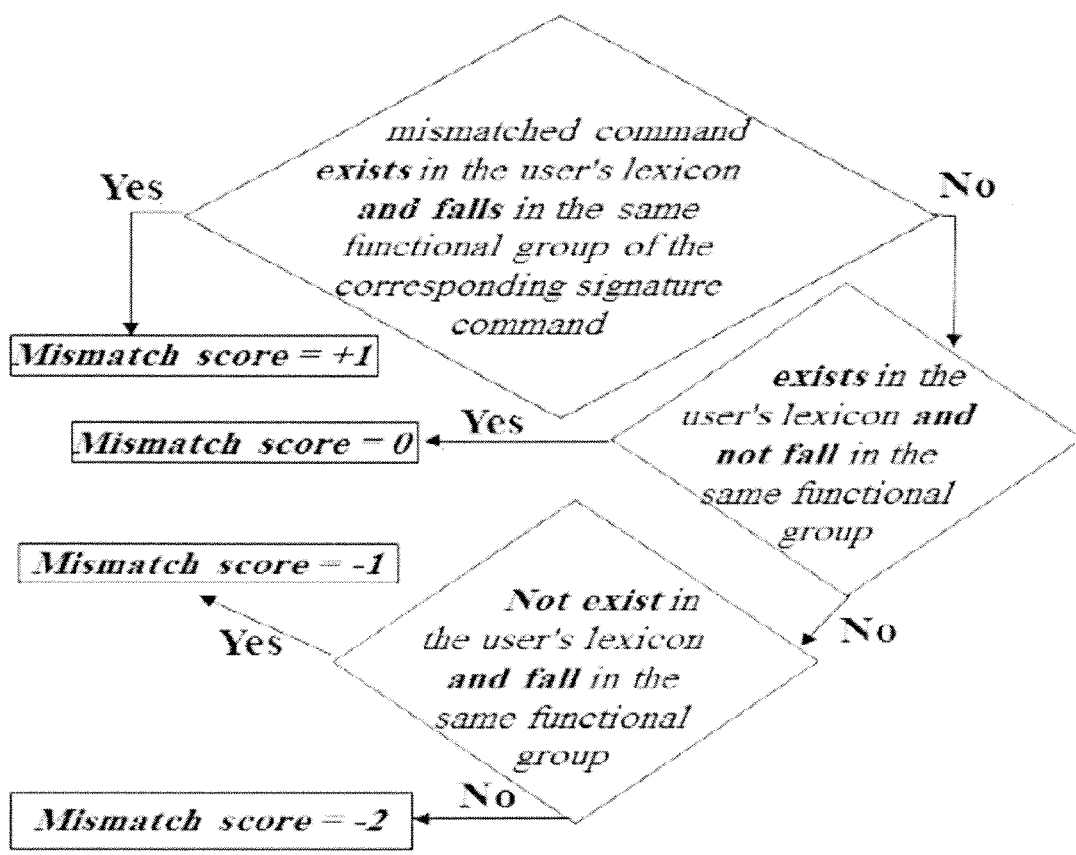
FIG. 5 is an illustration of an exemplary restricted permutation scoring system according to one embodiment.
Figure 6:
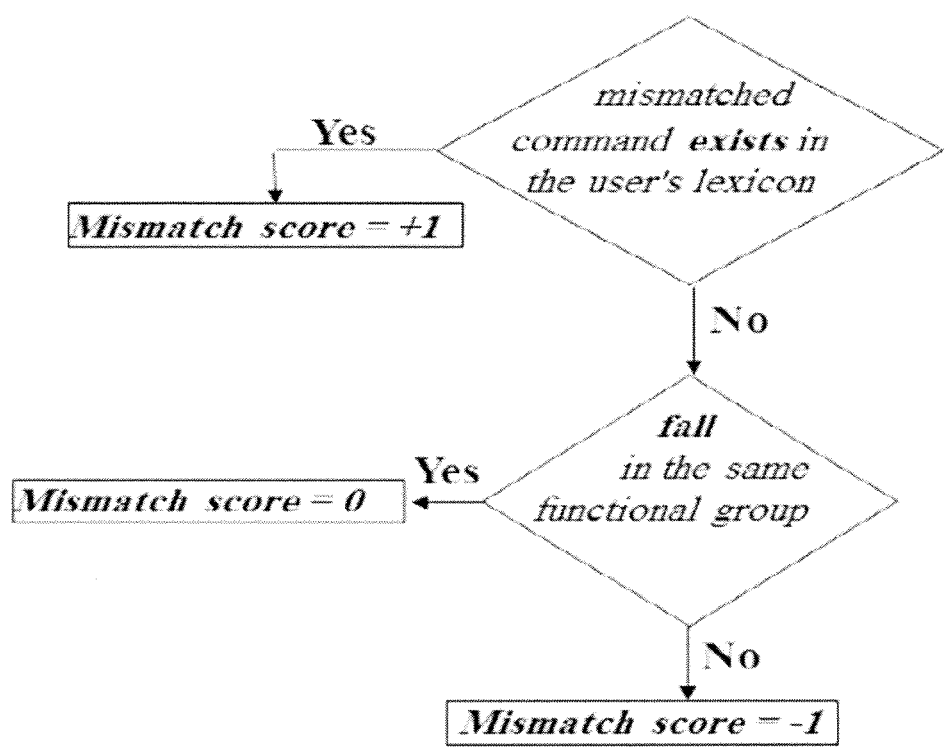
FIG. 6 is an illustration of an exemplary free permutation scoring system according to one embodiment.

In step 204, DDSGA 100 scoring parameters module 106 may compute one or more scoring parameters that may result in the maximum alignment score for each active user. In some alternatives, the DDSGA 100 Scoring parameters module 106 may return, at least three parameters for each user's current reference sequences and historical reference sequences. For example, these parameters may include, without limitation, the optimal test gap penalty, optimal signature gap penalty, average optimal threshold, maximum factor of test gaps (mftg) and mismatch score. The DDSGA 100 scoring parameters module 104 may insert into the list, top_match_list, all of the sample sequences with the top match score. This list may enable DDSGA 100 to align the top match sample sequences only rather than all the nt sequences. To build the top_match_list, DDSGA 100 may select the highest match scores for all the nt sequences. The match score MS of a sample sequence may be computed using Eq. 1 below. Then, the top_match_list sequences may be aligned to the ns overlapped signature subsequences using any possible gap penalty, i.e. the test gap penalty ranges from 1 to n, while the signature gap penalty ranges from 1 to n. The mismatch score may be 0 and the match score may be +2.

$$MS = \Sigma_{i=1,n} \Sigma_{k=1,nt} Min(Noccur\_Itself(p_i), Noccur\_seq_k(p_i)) \quad \text{Eq. 1}$$

Where n is the length of the sample sequence, nt is number of sample sequences. Noccur_Itself($P_i$) may be the number of occurrences of pattern i in the current evaluated test sequence. Noccur_Seq k ($P_i$) may be the numbers of occurrences of pattern i in sample sequence k. By computing each alignment separately, DDSGA 100 may produce several alignment scores for each combination of the scoring parameters and select as the optimal parameters those resulting in the maximum score. If several alignments result in this score, DDSGA 100 may select the one with the smallest penalties of inserting a gap into the signature subsequence and test subsequence, respectively. Eq. 1 may be used to compute the mismatch_score parameter using the restricted and the free permutation scoring systems as shown in FIGS. 5 and 6. Both systems may integrate command grouping scoring and binary scoring, which are based on distinct assumption about mutations in the audit data. Command grouping scoring assumes that sequences of audit data mutate by replacing some original symbols with functionally similar ones. Command grouping scoring may assign a positive static reward to exact matches and may score a mismatch through the functional groups of the two commands. If a command in the signature sequence aligns with a mismatched command in the sample sequence that belongs to the same group, the mismatch score may positive rather than negative. The mutation of the binary scoring system may follow these results where mutation does not replace base symbols in the user lexicon. These symbols may be a strong indicator of a legal use, but the original base symbols can be permuted in some fashion. The binary scoring system rewards exact matches by increasing the alignment score. A mismatch may result in an increase of the score if the mismatched command has previously occurred in the user lexicon and in a decrease otherwise. Both scoring systems may penalize the insertion of a gap into the reference sequence and into the test one by, by decreasing the score.

The optimal test gap penalty and the optimal signature gap penalty may be determined when inserting a gap into the sample sequence and the signature sequence respectively. DDSGA 100 may compute two distinct penalties for each user according to their distinct user behaviors. In this way, DDSGA 100 may determine the smallest penalties corresponding to the maximum alignment score.

DDSGA 100 may evaluate the mismatch score through, for example and not limited to, the restricted permutation scoring system and the free permutation scoring system. These scoring systems may be integrated with other scoring systems, such as, for example, the command grouping and binary scoring systems.

DDSGA 100 may compute a distinct average optimal threshold value for each user according to the changes in their behavior. This threshold may be used in both the detection and update phases and the sensitivity of the threshold may affect the accuracy of both phases, as discussed below.

The mftg parameter may be related to the largest number of gaps inserted into the user sample sequences to the length of these sequences. DDSGA 100 may compute a distinct parameter for each user and may update it in the update phase 103. The detection phase 102 may use the parameter to evaluate the maximum length of the overlapped signature subsequences in the TMBO 109.

The Restricted Permutation Scoring System may reward a mismatched command in the sample sequence if the two commands belong to the same group. These groups may be manually created from a set of common UNIX commands in the reference sequences. The mismatched command of the sample sequence should have previously occurred in the user lexicon. This may tolerate various permutations of previously observed patterns without reducing the score significantly.

The Free Permutation Scoring System is more tolerant than the Restricted Permutation Scoring System because it does not require that the mismatched commands belong to the same group. The Free Permutation Scoring System may even reward a mismatched command provided that it belongs to the user lexicon. This may tolerate a larger number of permutations of the signature patterns without reducing the score significantly.

In step 205, the DDSGA 100 average threshold module 107 may generate a dynamic average threshold for each user, which may be used in the detection phase 102 and may be updated in the update phase 103. In the detection phase 102, if the alignment score is lower than the threshold, then the behavior may be classified as a masquerade attack. While conventional system only considers snapshots of the user data, the detection phase of the invention may consider all the user data. This may improve the sensitivity of the threshold, including the one of the detection. The average threshold module 107 may use the same test and signature subsequences of the initialization module 104 and it can work with a sample sequence of any length because a user session can be of any length. At first, the average threshold module 107 may build a trace matrix, to record all alignment details of the current user. DDSGA 100 may align each sample sequence to all ns overlapped signature subsequences and run the average threshold module 107 several times, for example, twice, one for each scoring systems to identify the one that may be used.

The detection phase 102 may use the output of the average threshold module 107 to compare the two scoring systems. These alignments may use the optimal scoring parameters for the current user. The average threshold module 107 may apply Eq. 2 to compute the average alignment of sample sequence i, avg_align_i, and the sub_average score for all previous alignment scores, score_align_i, of sample sequence i. In Eq. 2, max_score_align_i may be the largest alignment score resulting from the alignment of sequence i to all ns signature subsequences. Then, the average threshold module 107 may apply Eq. 3 to compute the detection_update_threshold, the overall average of the nt sub average scores.

$$\text{avg\_align\_i} = \frac{\left(\sum_{j=1}^{ns} \text{score\_align\_i}_j\right)/ns}{\text{max\_score\_align\_i}} * 100 \qquad \text{Eq. 2}$$

$$\text{detection\_update\_threshold} = \frac{\sum_{k=1}^{nt} \text{avg\_align\_i}_k}{nt} \qquad \text{Eq. 3}$$

To compute the optimal alignment path and number of test gaps (ntg) to be inserted into sample sequence i, DDSGA 100 may apply the trace backward algorithm (TBA) to trace back the transitions, which may derive each optimal score. An example of a Trace Matrix is shown below in Table 2.

TABLE 2

| An Example of a Trace Matrix | | | | | |
|---|---|---|---|---|---|
| Test Seq. ID | Length of Test Seq. (lts) | Signature Subseq. ID | Optimal alignment | Number of Test Gaps (ntg) | Avg-align of test Seq. i (%) |
| 1 | 100 | 1 | 27 | 65 | |
| 1 | 100 | 2 | 33 | 60 | |
| . | . | . | . | . | |
| . | . | . | . | . | |
| . | . | . | . | . | |
| 1 | 100 | 49 | 77 | 22 | 70.31 |
| 2 | 100 | 1 | 37 | 57 | |
| 2 | 100 | 2 | 53 | 43 | |
| . | . | . | . | . | |
| . | . | . | . | . | |
| . | . | . | . | . | |
| 2 | 100 | 49 | 67 | 31 | 69.72 |
| . | . | . | . | . | . |
| . | . | . | . | . | . |
| . | . | . | . | . | . |
| 50 | 100 | 1 | 122 | 9 | |
| 50 | 100 | 2 | 134 | 7 | |
| . | . | . | . | . | |
| . | . | . | . | . | |
| . | . | . | . | . | |
| 50 | 100 | 49 | 102 | 11 | 73.75 |

The TBA may implement any conventional dynamic programming algorithms to build the backward-transition-matrix, as illustrated in FIG. 7. For example, the TBA may assist with filling the trace-matrix above in Table 2. The alignment process may also applies the TBA to extract the final alignment path. The TBA may trace back the transition-matrix according to the labels that the alignment may have inserted into this matrix. For example, one of four labels may be inserted: "M" if a match has occurred, "!M" if a mismatch has occurred, "GS" or "GT" if a gap has been inserted into a signature subsequence or into the test one. FIG. 7 outlines the TBA and shows the transition-matrix and the corresponding backward-transition-matrix to align the sample sequence "AWGHE" to the reference sequence "PAWHE". In FIG. 7, the thick and the thin arrows may show, respectively, the optimal path that leads to the maximum alignment score and those that do not lead to the maximum alignment score.

In step 205, the DDSGA 100 Maximum Test Gaps Module 108 may use Eq. 4 below to partition the current sample sequence and reference sequence into 2n overlapped subsequences, the Maximum Test Gaps Module 108 can divide the signature sequence using Eq. 4 to compute mftg, the largest number of test gaps inserted into the user sample sequences by the average threshold module. The maximum number of gaps may be much lower than n, the length of the test sequence, and it may differ for each user according to, for example, the level of similarity among the subsequences in the user signature and to the length of the test sequence. The number of gaps may be at most half of the sequence length. The Computational Enhancement (CE) for the session alignment of a user can be computed according to Eq. 5. We refer to the detection phase 102 for an example.

$$L = n + \left\lceil \text{Max}\left\{ _k^{nt}\left(\frac{ntg_k}{lts_k}\right)\right\} *n \right\rceil \qquad \text{Eq. 4}$$

Where ntg is number of test gaps inserted to each sample sequence, lts is the length of the sample sequence, and nt is number of the sample sequences of the user, fifty in case of SEA.

$$CE = (n - \lceil mftg \rceil)*(100/(2*n))\% \qquad \text{Eq. 5}$$

Where Maximum Factor of Test Gaps (mftg) may be inserted into all user sample sequences is computed as in Eq. 6.

$$mftg = \text{Max}\left\{_k^{nt}\left(\frac{ntg_k}{lts_k}\right)\right\} \qquad \text{Eq. 6}$$

Figure 10:
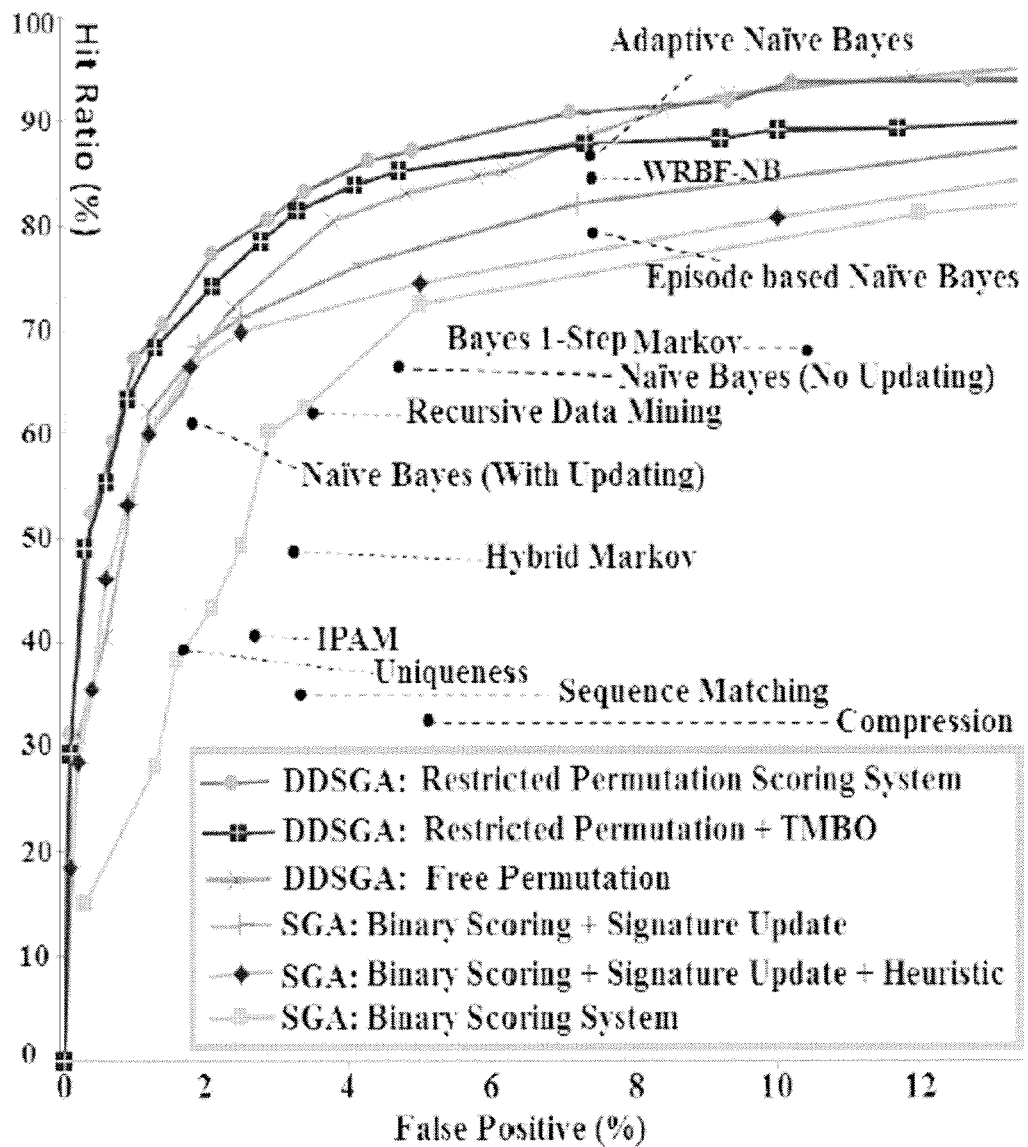
FIG. 10 is an illustration of an exemplary chart comparing DDGSGA with the TMBO approach to conventional intrusion detection systems according to one embodiment.

In step 206, the DDSGA 100 detection phase 102 may use the restricted permutation scoring system, mftg in Eq. 6, and the scoring parameters of each user to align the session patterns of overlapped subsequences of the user signatures. TMBO may improve the Heuritic Aligning of conventional masquerade detection systems. After splitting the signature sequence into a set of overlapped blocks of length L, see Eq. 4, the TMBO module 109 may choose the subsequence with the highest match to be used in the alignment process. In some alternatives, all overlapped subsequences should be aligned as they may have the same highest match value. On average, the number of alignments may be smaller because of the variation between the overlapped signature subsequences. The TMBO approach mainly depends upon two parameters: (a) Number of average alignments for the detection process, and (b) the effect of the TMBO on false alarm rates and hit ratio. For example, with respect to (a) TMBO module 109 may reduce the alignment computations. In another example, with respect to (b) the ROC curve and Maxion-Townsend values may be used to evaluate TMBO as illustrated in FIG. 10, which shows the user session patterns to be aligned to the signature patterns.

The first step of the TMBO module 109 may be to compute the following length of the overlapped subsequences according to Eq. 7 below:

$$L = (n + \lceil mftg*n \rceil) = (10 + \lceil 33/100*10 \rceil) = 10 + \lceil 3.3 \rceil = 10 + 4 = 14 \qquad \text{Eq. 7}$$

With respect to the one in the initialization module 104, the current overlapping runs with length L rather than 2n. FIG. 9 shows an exemplary resulting overlapped signature subsequences of size L=14. The last subsequence, i.e. subsequence 15, may be shorter than L, but it may be longer than the test sequence.

The second step of the TMBO module 109 may compute the match corresponding to each subsequence as shown in the front of each subsequence in FIG. 9. For example, only the subsequence 1 may be considered because those for other subsequences are similar. If Match(X, s), the minimum between the occurrences of X in, respectively, a user session and in a subsequence, then Match (subseq.1)=

$$\Sigma_{(X\ in\ \{A,B,C,D,E,F\}}(\text{Match}(X,\text{subseq}.1)) = \Sigma(\text{Min}(3,1), \text{Min}(2,2), \text{Min}(1,2), \text{Min}(1,2), \text{Min}(2,2), \text{Min}(1,2)) = \Sigma(1,2,1,1,2,1) = 8 \qquad \text{Eq. 8}$$

The third step of the TMBO module 109 may be to choose the top match subsequences, for example, subsequences 2 and 15 in the example above, as the best signature subsequences to be aligned against the test session patterns of the user. To evaluate the reduction of the workload due to TMBO, the Number of Asymptotic Computations (NAC) computed by Eq. 9 below may be considered. For instance, in the previous example, TMBO may reduce the number of alignments from 3000 to 280 with a saving of 90.66%.

$$NAC = Avg\_n\_align*Sig\_len*Test\_len \qquad \text{Eq. 9}$$

Where Avg_n_align is the average number of alignments required for one detection session over all existing users; Sig_len is the length of the overlapped signature subsequence; and Test_len is the length of the test sequence.

To determine if the session patterns of the current user contain a masquerader, the final step of the TMBO module 109 may be to compare the highest scores of the previous two alignments against a detection_update_threshold. For example, if at least one of the previous eight alignments has a score larger than or equal to the detection_update_threshold, then an inline update process as discussed below may be executed for the signature subsequence and the user lexicon.

Figure 15:
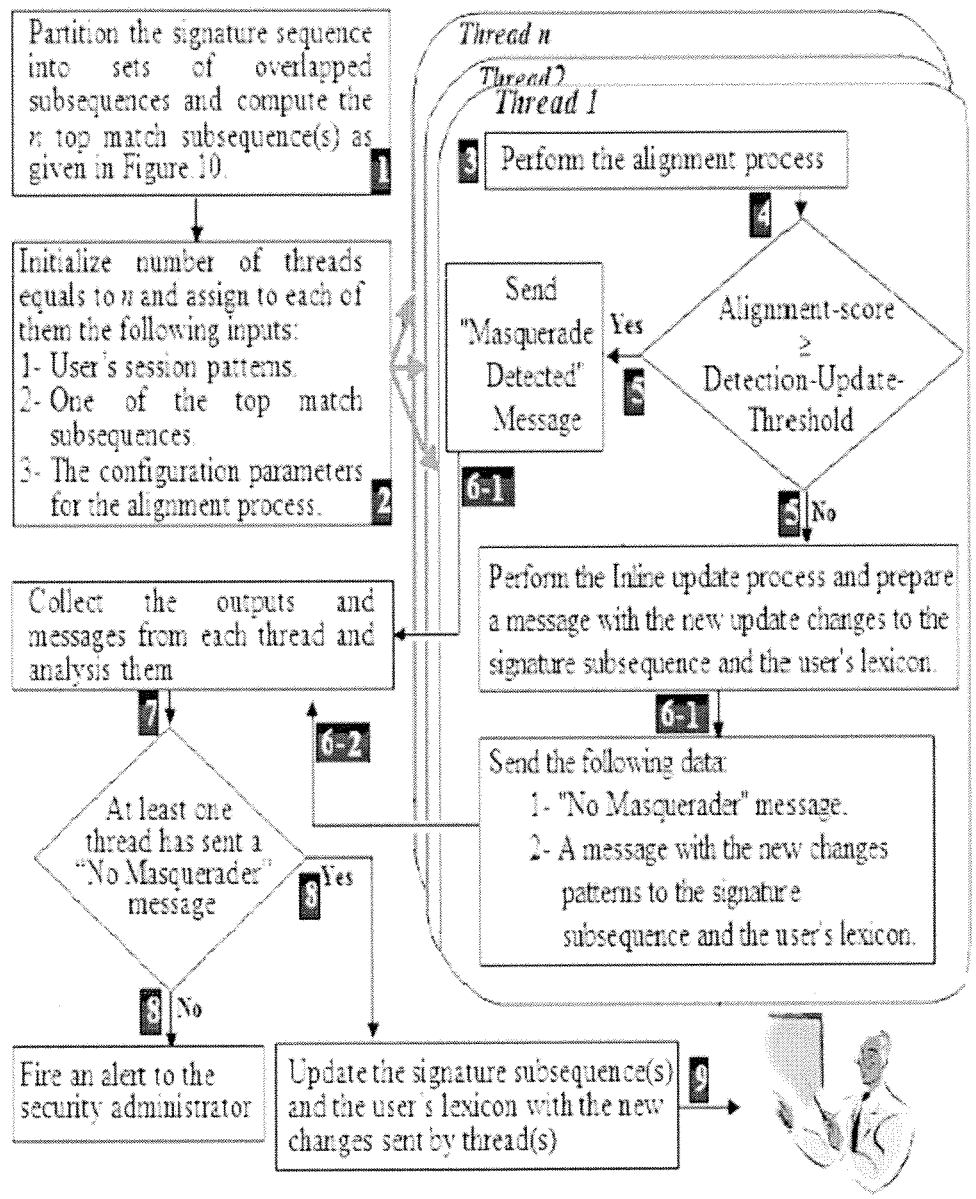
FIG. 15 is an illustration of an exemplary process of the DDSGA parallelized detection module according to one embodiment.

Because TMBO partitions the user signature into a set of overlapped subsequences, DDSGA 100 can parallelize the detection algorithm because it can align the commands in the user test session to each top match signature subsequence separately. If a thread or a process returns a computed alignment score which may be at least equal to the detection_update_threshold, then it may sends "No Masquerader" message and may then run an inline update of both its signature subsequence and the lexicon of the current user. Instead, if the alignment score is lower than the detection_update_threshold, the thread or the process may raise a "Masquerader Detected" alert as illustrated in FIG. 15.

In step 207, the DDSGA 100 update phase 103 may extend both the user signatures and user lexicon list with the new patterns to reconfigure the system parameters. In some alternatives, the update phase 103 may include two components, an inline update module 111 and the long term update module 112. The inline module 111 may find areas in user signature subsequences to be updated and augmented with the new user behavior patterns. In some alternatives, the inline module 111 may update the user lexicon by inserting new commands into the user lexicon. If the test sequence pattern matches the corresponding signature subsequence pattern from step 206, the inline module 111 may not perform any updates, because the alignment may have properly used the symbol in the proper subsequence to find the optimal alignment. If a gap is inserted into either or both the test sequences and signature sequences, the inline module 111 may not perform any updates, because the symbols that are aligned with gaps are not similar and should be neglected. If there is at least a mismatch between the patterns in the test sequences and signature sequences, the inline module 111 may consider all the mismatches within the current test sequence before updating the signature subsequences and user lexicon under several conditions, such as, for example the following two conditions. In the first condition, the inline module 111 may insert into the user signatures only those patterns that are free of masquerading records. This may happen anytime the overall_alignment_score for the current test sequence is larger than or equal to the detection_update_threshold. In the second condition, the current test pattern should have previously appeared in the user lexicon or belong to the same functional group of the corresponding signature pattern.

Figure 13:
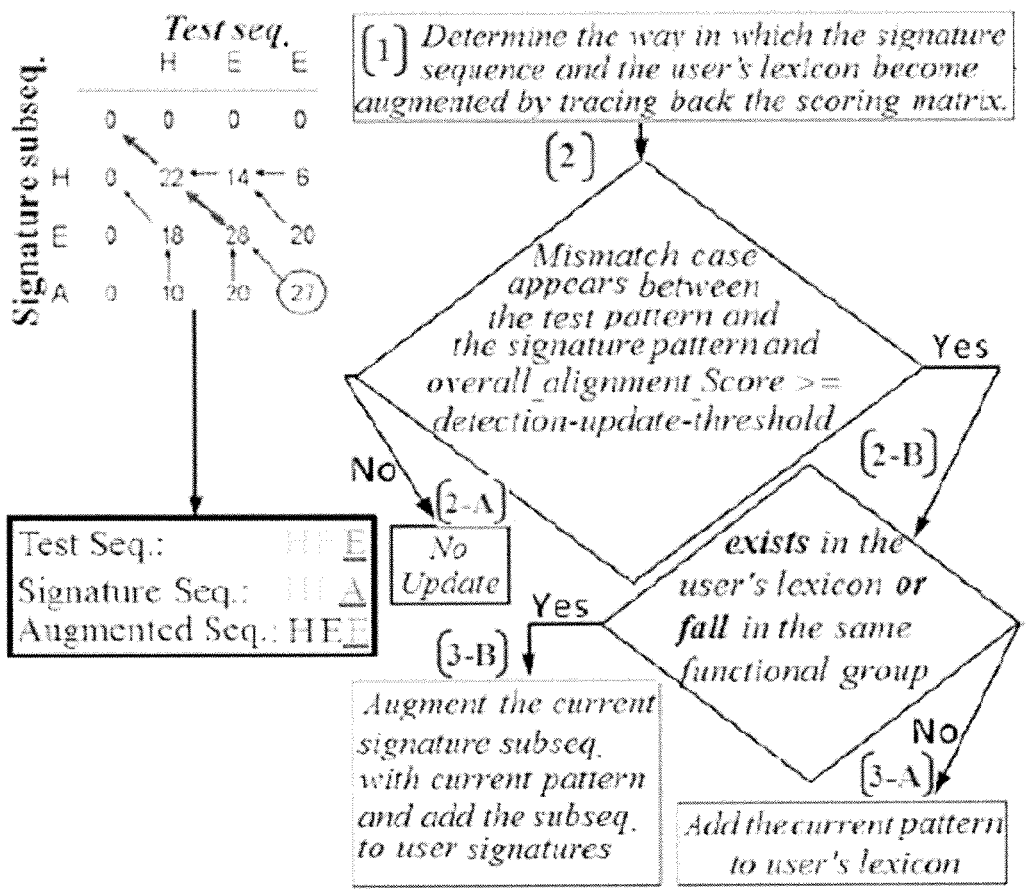
FIG. 13 is a flowchart illustrating an exemplary DDSGA inline update step according to one embodiment.

Based on these two conditions, the inline module 111 may update the user lexicon with the new pattern if it does not belong to the lexicon. The inline module 111 may also extend the pattern with the current signature subsequence and may add the resulting subsequence to the user signatures without changing the original one. For instance, if a pattern in the user lexicon or in the same functional group of its corresponding signature pattern has participated in a conserved alignment, then a new permutation of the behavior of the user may have been created. For example, if the alignment score of the test sequence in FIG. 13 may be larger than or equal to the detection_update_threshold, then the pattern 'E' at the end of this test sequence may have a mismatch with 'A' at the end of the signature subsequence. If 'E' exists in the user lexicon or belongs to the same functional group as 'A', the signature subsequence may be augmented so that the position with 'A' matches with both 'A' or 'E'. If 'E' does not belong to the lexicon, it is also inserted into it. This simply embeds observed variations in the signature sequence without destroying any information it encodes. In this case, a new augmented subsequence (HEE) may be inserted into the user signature subsequences. If only the first condition is satisfied, only the user lexicon is updated so that the following checks use the new pattern.

Besides improving the computational performance of DDSGA 100 updates, the inline module 111 may also improve signature update scheme of the DDSGA 100 by (i) using the parameters, the threshold, and the scoring system returned by the configuration phase 101; (ii) running in parallel with the detection phase and may starts as soon as the alignment score is computed, in some alternatives, the signature update scheme may run independently after each detection process in step 206 and it may repeat the backward tracing step; and/or (iii) improving flexibility in the signature update by considering any occurrence of commands permutations or functionality matching.

Figure 14:
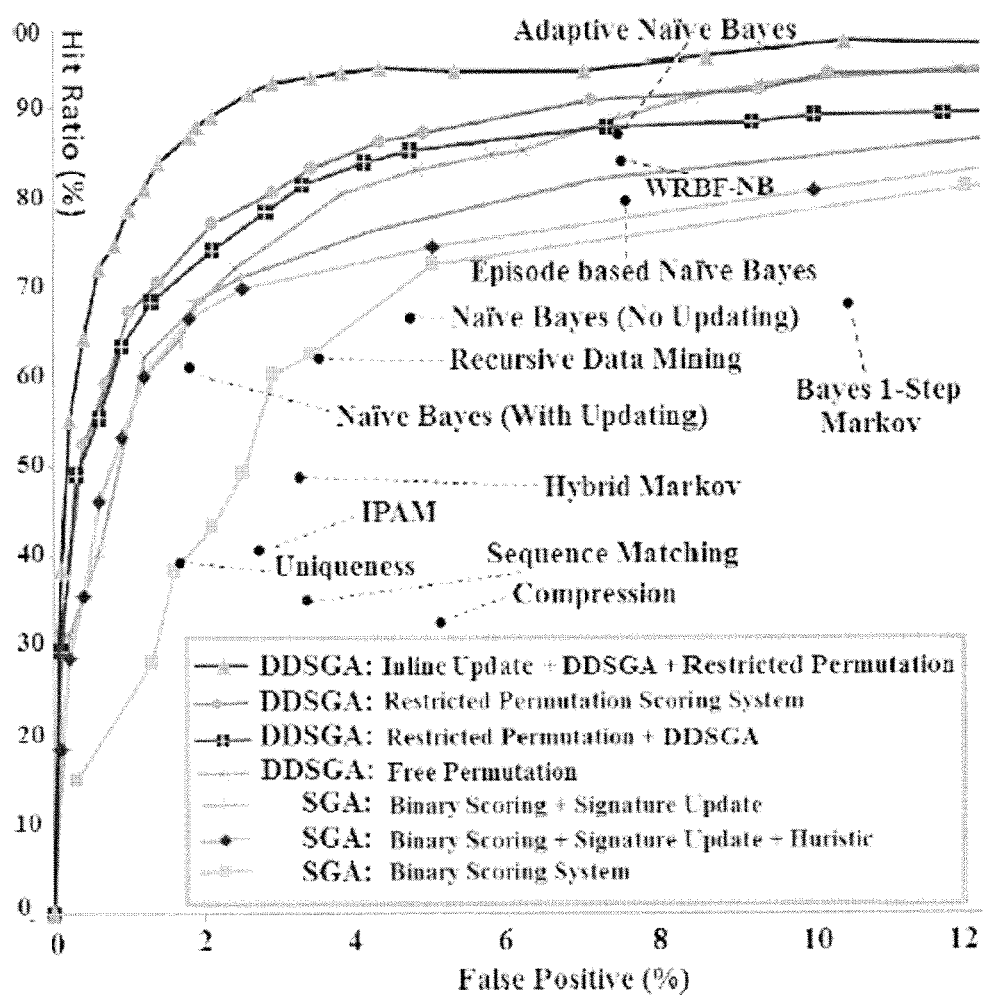
FIG. 14 is an illustration of an exemplary chart of the impact of the inline update on the DDSGA compared with other conventional intrusion detection systems according to one embodiment.

FIG. 14 and Table 3 below illustrate an example of how the inline module 111 may reduce the false alarm rates and may improve the hit ratio and accuracy of masquerade detection in comparison with conventional masquerade detection systems.

TABLE 3

Convention Masquerade Detection Approaches versus DDSGA 100 with its Inline Update Module

| | | | |
|---|---|---|---|
| DDSGA (Inline Update + TMBO + Restricted Permutation) | 88.4 | 1.7 | 21.8 |
| DDSGA (Restricted Permutation, Without Updating) | 83.3 | 3.4 | 37.1 |
| DDSGA (Restricted Permutation, Without Updating) + TMBO | 81.5 | 3.3 | 38.3 |
| DDSGA (Free Permutation) | 80.5 | 3.8 | 42.3 |
| SGA (Signature updating) | 68.6 | 1.9 | 42.8 |
| SGA (Signature updating) + Heuristic | 66.5 | 1.8 | 44.3 |
| Naïve Bayes (With Updating) | 61.5 | 1.3 | 46.3 |
| SGA (Binary Scoring, No Updating) | 60.3 | 2.9 | 57.1 |

The long-term module 112 may update DDSGA 100 with the latest changes in the alignment parameters. It may also update the dynamic threshold values, scoring parameters, and the overlapping length i.e., the length of the overlapped signature subsequence according to maximum number of inserted test gaps. In some alternatives, long-term module 112 may reconfigure the DDSGA 100 parameters through the outputs of the inline update module 111. The long-term module 112 may be executed based on several strategies, for example, periodically, during the DDSGA 100 idle time, or at a pre-set threshold. The proper strategy may be selected according to the characteristic and requirements of the monitored system. The periodic strategy may run the reconfiguration step with a fixed frequency, e.g. 3 days or 1 week. To reduce the overhead, the idle time strategy may run the reconfiguration step anytime the DDSGA 100 is idle. This solution may optimize the use of the network and computational resources. The threshold strategy may run the reconfiguration step as soon as the number of test patterns inserted into the signature sequences reaches a threshold that is distinct for each user and frequently updated. This approach is highly efficient because it runs the module only if the signature sequence is changed.

In another embodiment of the invention, DDSGA 100 may be deployed to detect masquerade detection in a cloud based environment using conventional framework, such as, for example, the use of datasets that include distinct audit data from distinct host operating systems and physical network environment. This may supports an evaluation of DDSGA 100 that can use different kinds of audit sequences.

In yet another embodiment, three different steps are used together to detect masquerader attacks in a cloud system. The first step applies DDSGA to sequences of user systems calls from the host environment. The second step uses audits collected from the network environment, such as NetFlow audits. This method uses audits that describe the exchange of information among the host environment that the user is accessing and the other environments, including for example, information on IP network traffic as it enters or exits a router interface. In other words, it describes the interactions among environments due to the user activities. The third step uses a neural network to integrate the outputs of the first two steps and statistical information associated with the active session, such as the login period, the user's source IP address and login failure actions. These three steps offer three strategies to build a user profile, using i) the user activities, ii) how the activities influence interactions among environments and iii) then integrating the two steps into a single a single user profile.

Figure 16:
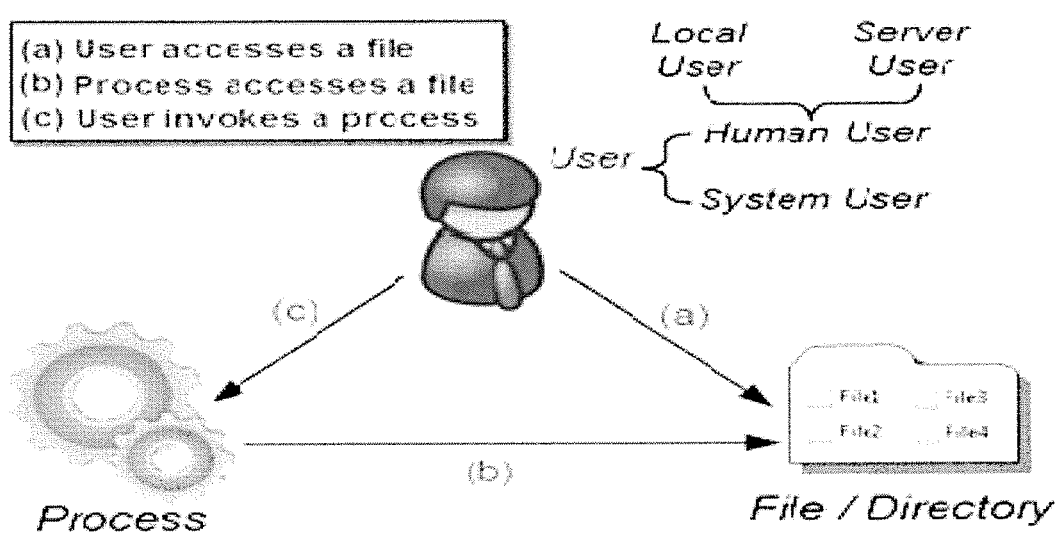
FIG. 16 is an illustration of an exemplary process showing the behaviors triangle model.

In the first step of this approach, the system calls are utilized because they can result in a high degree of information assurance. The calls reflect all system and activities and their monitoring is tightly integrated with the operating system. The monitoring process becomes more tamper-resistant with respect to malicious updates of the monitored information. Most of the current IDSs {Inventors—please provide more information on IDSs—what does it stand for?} consider all system calls categories which may result in a slow detection process and a high false alarm rates with a low hit ratio. This approach utilizes calls related to file access and to process activities. These calls are essential and unavoidable for any user and they reflect any regularity of the user behavior in audit data more than other calls. This regularity of audit data simplifies the labeling of abnormal behavior. Three user behaviors are recorded, as show in FIG. 16, (a) user access a file, (b) process accesses a file, and (c) user invokes a process. These three behaviors for the Behaviors Triangle Model, which classifies users into human and system users. Unlike human users, system users are dedicated to a few tasks and have specific privileges and likely to behave statically.

In the second step of this approach, a NetFlow profile is built for each source IP address based upon sequences of network actions. These network actions are captured by a packet sniffer, i.e., a piece of software or hardware designed to intercept data as it is transmitted over a network (wireless and non-wireless) and decode the data into a format that is readable for humans. For each action, a sequence of desitnation IPS that the user accessed successfully and the protocols used for each access are recorded to be used by DDSGA as a sequence of user audit patterns.

Figure 17:
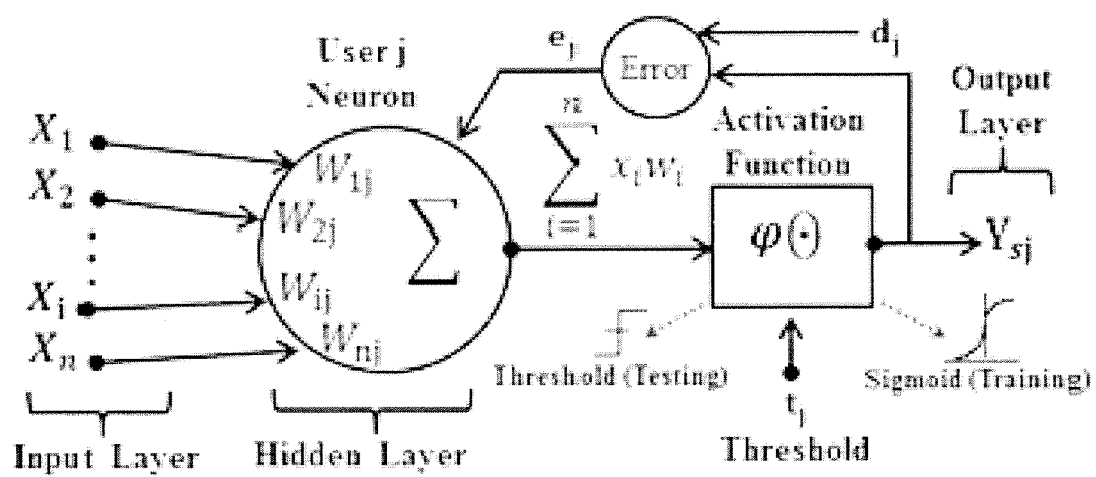
FIG. 17 is an illustration of a neural network model in the training mode for one user.

In the third step, a neural network model is used to integrate the host and network detection outputs of the first two steps. This integration improves the accuracy and the efficiency of the overall masquerade detection. We have implemented the integration through a Threshold Logic Unit (TLU). See FIG. 17. A TLU is an artificial neuron which has inputs, outputs, some restrictions on the possible weights, and a threshold value which may be flexible. The TLU works for each user independently and is adapted to the consistency of each user behavior. A group of TLUs consist of a complete neural network model for all users in the Cloud Intrusion Detection Dataset ("CIDD"). The TLU has 3 layers: one input layer of dimension n=4 inputs, an hidden layer with 1 summing junction neuron, and an output layer with 1 neuron connected to an activation function. The activation function depends upon the TLU operational mode. The detection mode uses a threshold function which is equal to 0 if the sum of the input is less than a threshold (tj), i.e., if there is a masquerade attack in session s, The function is equal to 1 if the sum of the inputs is larger than or equal to (tj) i.e., if s is free of attacks. In learning mode, the neural network uses the sigmoid function to range the outputs between 0 and 1 to adapt with the training phase and the weight adjustments.

The system calls and NetFlow data used to tune and evaluate the three above-presented steps are those available in the CIDD. DDSGA is applied to the user audits in CIDD in a fully functional cloud system according to the distributed architecture of CIDD.

The invention will be illustrated in more detail with reference to the following examples, but it should be understood that the present invention is not deemed to be limited thereto.

Example 1

DDSGA 100 may be used to analyze a sample dataset, such as the SEA dataset. The SEA datasets consists of commands and user names collected from UNIX acct audit data. The data describe 50 different users each issuing 15000 commands. The first 5000 commands of each user may be assumed to be genuine. The remaining commands of a user may be split into 100 blocks of 100 commands each. Each block may be seeded with masquerade users, i.e. with commands of other users. There is a 1% probability that a block is a masquerader and, in this case, there is a probability of 80% that the next one is a masquerader as well. As a result, approximately 5% of the test data may be masquerades. It requires about 500,000 operations to test one user session for masquerade attacks with the SEA dataset, because the length of the reference sequence is 5000 while that of the sample sequence is 100. The resulting overhead may be unacceptable in multiuser environments like cloud systems or in computationally limited devices like wireless systems.

In the case of SEA, ns=49 subsequences, a tested block may include 100 commands because SEA marks each 100 command block as an intrusion or a non-intrusion. Because SEA does not supply any information on which commands in a block correspond to the intrusion, the accuracy of larger or smaller blocks cannot be checked. The dynamic average threshold for both the detection and update phases may be the average score of all the alignments between each sample sequence of length 100-command and the 49 overlapped 2n signature subsequences. A sample sequence may not be aligned with the signature subsequence that contains the sample sequence itself because this returns a 100% alignment score.

Figure 4:
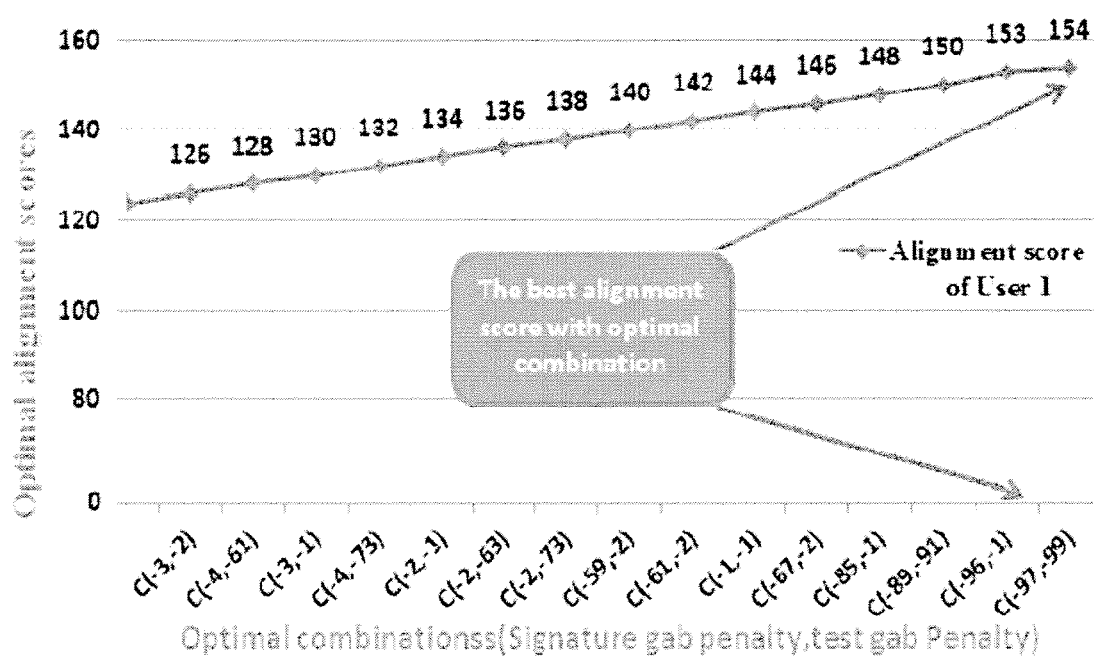
FIG. 4 is an illustration of an exemplary best alignment score that corresponds to the optimal combinations of gap penalties for an exemplary user according to one embodiment.

To identify the highest alignment score for each user in the SEA dataset, DDSGA 100 produces several alignment scores for each combination of the scoring parameter, as illustrated below in FIG. 4 for user 1 in the SEA dataset and Table 5 below.

TABLE 5

Example of the Top Match Scores of User 1 in the SEA dataset

| Max alignment score | Test sequence index (i) | Signature gap penalty | Test gap penalty | Optimal combination |
|---|---|---|---|---|
| 154 | 2 | 99 | 95 | — |
| 154 | 5 | 100 | 95 | — |
| 154 | 8 | 97 | 100 | — |
| 154 | 13 | 97 | 99 | ok |

Example 2

The effects of the alignment parameters on the false positive and false negative rates and on the hit ratio and two of the scoring systems for the DDSGA 100 were evaluated with the test and signature blocks of the SEA dataset. A receiver operating characteristic (ROC) curve and the Maxion-Townsend cost function defined in Eq. 10 below were to compare the performance and accuracy of the DDSGA 100 against conventional masquerade detection systems.

$$\text{Cost} = 6 * \text{False\_Positive\_Rate} + (100 - \text{HitRatio}) \qquad \text{Eq 10}$$

The maximum test gap module 108 was not applied in this example. False positives, false negatives and hits are computed for each user, transformed into the corresponding rates that are then summed and averaged over all 50 users in the SEA dataset. Eqs. 11, 12 and 13 below show the DDSGA 100 metrics.

$$TotalFalsePositive = \left(\left(\sum_{k=1}^{nu} \frac{fp_k}{n_k}\right)/nu\right)*100 \qquad \text{Eq. 11}$$

Where fp is the number of false positive alarms, n is the number of non-intrusion command sequence blocks and nu is the number of users, (50 in this example).

$$TotalFalseNegative = \left(\left(\sum_{k=1}^{nui} \frac{fn_k}{ni_k}\right)/nui\right)*100 \qquad \text{Eq. 12}$$

Where fn is the number of false negatives, ni is the number of intrusion command sequence blocks and nui is the number of users who have at least one intrusion block $$TotalHitRatio = 100 - TotalFalseNegative \qquad \text{Eq. 13}$$

Figure 8:
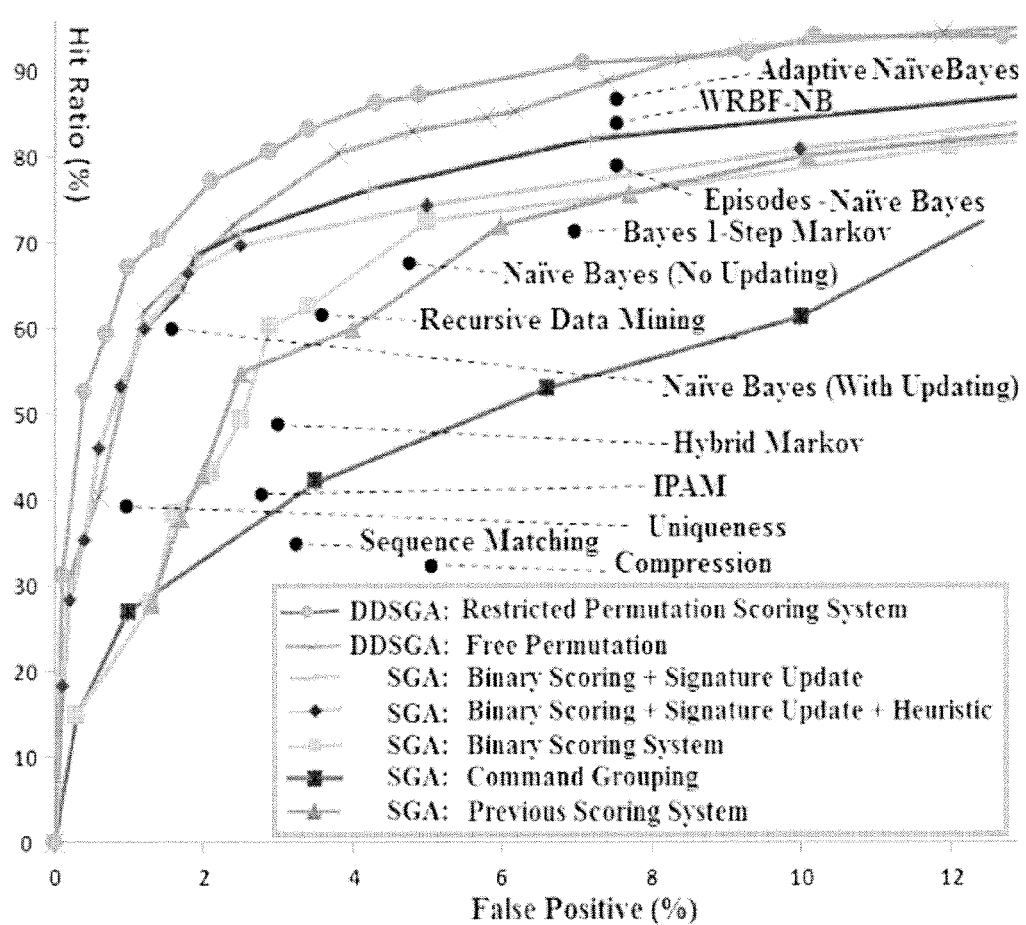
FIG. 8 is an illustration of an exemplary chart comparing the DDSGA to conventional intrusion detection systems according to one embodiment.

To plot the ROC curve, conventional masquerade detection systems using the SGA algorithm have used distinct values of the alignment parameters to obtain different false positive rates in the x-axis and the corresponding hit ratios in y-axis. This example used distinct values of some alignment parameters such as reward for matches and rewards or penalties for mismatches computed by the two scoring systems. FIG. 8 shows the ROC curve for the two scoring systems, and other conventional masquerade detection systems that also use SEA dataset, based upon their previous metrics. According to FIG. 8, the restricted permutation system results in higher hit ratio with corresponding low false positive rates. As the false positives rate increases, the free permutation system achieves a higher hit ratio than the restricted one because it can tolerate a large number of mutations and deviations in user behaviors. This experiment identifies the restricted permutation system as a suitable scoring system for all the phases of DDSGA 100. Table 6 below compares DDSGA 100 using the restricted and the free permutation scoring systems against the conventional masquerade detection approaches sorted by Maxion-Townsend cost. The results for the various conventional masquerade detection approaches, including all ROC curve values, are listed in Table below and are sorted by "Maxion-Townsend cost" to simplify the comparison by considering both the false positive and hit ratio.

TABLE 6

Comparison of the DDSGA 100 scoring systems to conventional masquerade detection techniques

| Approach Name | Hit Ratio % | False Positive % | Maxion T. Cost |
|---|---|---|---|
| DDSGA (Restricted Permutation) | 83.3 | 3.4 | 37.1 |
| DDSGA (Free Permutation) | 80.5 | 3.8 | 42.3 |
| SGA (Signature updating) [3] | 68.6 | 1.9 | 42.8 |
| SGA (Signature updating + Heuristic Aligning) [3] | 66.5 | 1.8 | 44.3 |
| Naïve Bayes (With Update) [11] | 61.5 | 1.3 | 46.3 |
| SGA (Binary Scoring)[3] | 60.3 | 2.9 | 57.1 |
| Adaptive Naïve Bayes [21] | 87.8 | 7.7 | 58.4 |
| Recursive Data Mining [18] | 62.3 | 3.7 | 59.9 |
| Naïve Bayes (No Update) [11] | 66.2 | 4.6 | 61.4 |
| WRBF-NB[20] | 83.1 | 7.7 | 63.1 |
| Episode based Naïve Bayes [19] | 77.6 | 7.7 | 68.6 |
| Uniqueness [8] | 39.4 | 1.4 | 69.0 |
| Hybrid Markov [14] | 49.3 | 3.2 | 69.9 |
| SGA (Previous Scoring) [2] | 75.8 | 7.7 | 70.4 |
| Bayes 1-Step Markov [13] | 69.3 | 6.7 | 70.9 |

TABLE 6-continued

Comparison of the DDSGA 100 scoring systems to conventional masquerade detection techniques

| Approach Name | Hit Ratio % | False Positive % | Maxion T. Cost |
|---|---|---|---|
| IPAM [15] | 41.1 | 2.7 | 75.1 |
| SGA (Command Grouping) [3] | 42.2 | 3.5 | 78.8 |
| Sequence Matching [16] | 36.8 | 3.7 | 85.4 |
| Compression [6] | 34.2 | 5.0 | 95.8 |

The computational complexity of conventional masquerade detection systems using the SGA is significant. As an example, it requires about 500,000 operations to test one user session for masquerade attacks with the SEA dataset, because the length of the reference sequence is 5000 while that of the sample sequence is 100. The resulting overhead may be unacceptable in multiuser environments like cloud systems or in computationally limited devices like wireless systems. To evaluate TMBO, FIG. 9 shows the user session patterns to be aligned to the signature patterns. For example, the configuration phase 101 may returns these values: signature gap_penalty=9, test gap_penalty=5, optimal_score_sys="Restricted Permutation", detection_update_threshold=82.2% and mftg=33%.

The evaluation using the SEA dataset shows that TMBO reduces the maximum number of alignments from 49 to an average of 5.13 alignments per detection, a substantial improvement in detection scenarios. Table 7 shows the asymptotic computations for three detection approaches. The first is TMBO without the inline update module. The second one is the Heuristic Aligning with signature update. Finally, the third one is the conventional SGA algorithm without the Heuristic Aligning or update feature. The NAC per one detection session can be computed as in Eq. 14. If each of the fifty users in SEA dataset has one active session in a multi-user system, then $$Total\_NAC = NAC * 50. \qquad \text{Eq. 14}$$

TABLE 7

TMBO Approach in three detection approaches

| Approach Name | Avg-n-align | NAC per 1 user | NAC per 50 user |
|---|---|---|---|
| DDSGA with L = 145.73 | 5.13 | 5.13 * 145.73 * 100 = 74759.49 | 74759.49 * 50 = 3737974.5 |
| SGA with Signature length = 200 | 4.5 | 4.5 * 200 * 100 = 90000 | 90000 * 50 = 4500000 |
| Traditional SGA with Signature length = 200 | 49 | 49 * 200 * 100 = 980000 | 980000 * 50 = 49000000 |

To evaluate false alarm rates and hit ratios, TMBO is evaluated using the ROC curve and Maxion-Townsend score. Table 8 and FIG. 10 show that TMBO has a lower impact on the overall accuracy than other conventional masquerade detection approaches.

TABLE 8

DDSGA 100 with its two scoring systems versus conventional masquerade detection approaches

| Approach Name | Hit Ratio % | False Positive % | Maxion-Townsend Cost |
|---|---|---|---|
| DDSGA (Restricted Permutation, Without Updating) | 83.3 | 3.4 | 37.1 |

TABLE 8-continued

DDSGA 100 with its two scoring systems versus
conventional masquerade detection approaches

| Approach Name | Hit Ratio % | False Positive % | Maxion-Townsend Cost |
|---|---|---|---|
| DDSGA (Restricted Permutation, Without Updating) + TMBO | 81.5 | 3.3 | 38.3 |
| DDSGA (Free Permutation) | 80.5 | 3.8 | 42.3 |
| SGA (Signature updating) | 68.6 | 1.9 | 42.8 |
| SGA (Signature updating) + Heuristic | 66.5 | 1.8 | 44.3 |
| Naïve Bayes (With Updating) | 61.5 | 1.3 | 46.3 |
| SGA (Binary Scoring, No Updating) | 60.3 | 2.9 | 57.1 |

Example 3

Figure 11:
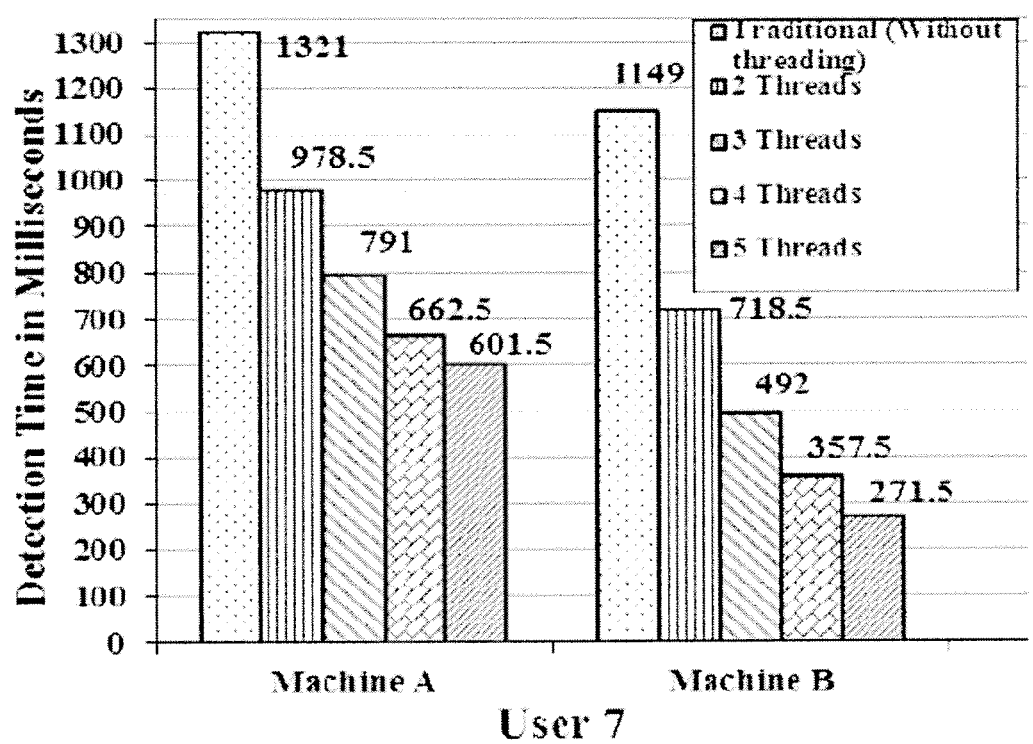
FIG. 11 is an illustration of an exemplary chart for FPM and SPM modes according to one embodiment.

The influence of the parallelized detection module 110 on the DDSGA 100 was evaluated using the SEA dataset and two machines, labeled "machine A" and "machine B." Machine A had the following configuration, Intel Core 2 Duo Processor E4500 (2M Cache, 2.20 GHz) with 4 GB of memory and running Windows 7 SP1. Machine B had the following configuration, Intel Core i3-2330M (3M Cache, 2.30 GHz) with 6 GB of memory and running Windows 7 SP1. The results of this example show that there are two operational modes of the parallelized detection module 110: Full Parallelization Mode (FPM) and Semi Parallelization Mode (SPM). The parallelized detection module 110 selects the most appropriate mode according to the capabilities of the underlying machine and to n_aligns, the number of alignments per detection. For example, the parallelized detection module 110 selects the FPM mode if the machine capabilities match n_aligns so that the module achieves the best performance. For example, in the detection sessions of user 7, n_aligns=5, FIG. 11 shows that if five threads are used then each thread runs a distinct alignment and this minimizes the detection time.

Figure 12:
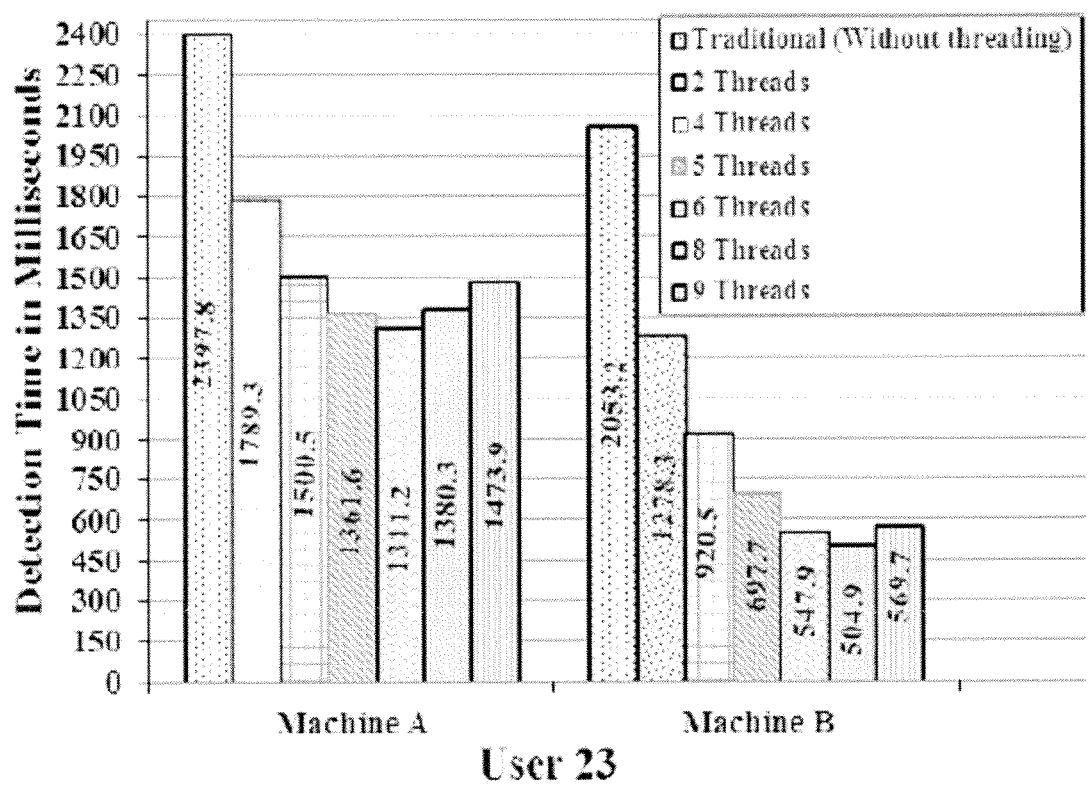
FIG. 12 is an illustration of an exemplary chart for FPM and SPM modes according to one embodiment.

The SPM mode is selected if the machine capabilities do not match the required n_aligns. This results in small performance degradation due to inactive threads. The SPM mode is rarely selected because the fifty users of the SEA dataset results in a value of Avg_n_align, equals to 5.13. Hence, on average, the parallelized detection module uses 6 threads to run a detection session. A SPM mode example is the detection sessions of user 23 where n_aligns=9. FIG. 12 shows that the shortest detection time is reached when running 6 threads in machine "A" and 8 threads in machine "B". In this case, 3 threads are idle in machine "A" and 1 in machine "B".

Although the foregoing description is directed to the preferred embodiments of the invention, it is noted that other variation and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. A method for identifying masquerade attacks in a network computing environment, the method comprising:
receiving data from at least one user with an active session on a system;
receiving historical data for each of the at least one user;
applying an algorithm to the received data to build at least one profile for each of the at least one user, wherein the at least one profile comprises one or more sample signatures;
applying an algorithm to the received historical data to build at least one model for each of the at least one user, wherein said at least one model comprises one or more reference signatures;
identifying a dynamic threshold;
determining an alignment score between the sample signatures to the reference signatures by comparing first alignment parameters from the sample signatures with second alignment parameters from the reference signatures;
determining an intrusion masquerade event based on the alignment score being greater than the identified dynamic threshold; and
updating patterns for each of the at least one active user, wherein the first alignment parameters are selected from at least three of: optimal gap penalties, mismatch score, average optimal threshold, and maximum factor of test gaps, and
wherein the second alignment parameters are selected from at least three of: optimal gap penalties, mismatch score, average optimal threshold, and maximum factor of test gaps.

2. The method of claim 1, wherein the data is selected from a group consisting essentially of: command line commands, system calls, mouse movements, opened file names, opened windows title, login time, location, session duration, CPU time, commands issues, user ID, user IP address, other network actions and combinations thereof.

3. The method of claim 1, wherein the data comprises non-masquerade data and masquerade data.

4. The method of claim 1, wherein the sample signatures comprises one or more non-overlapped-blocks with a length based on a pre-determined sample size.

5. The method of claim 1, wherein the reference signatures comprises one or more non-overlapped-blocks with a length based on a pre-determined sample size.

6. The method of claim 1, the dynamic threshold is based on information in each of the at least one profile.

7. The method of claim 1, wherein the reference signatures are longer than the sample signatures.

8. The method of claim 7, wherein the reference signatures are longer than the sample signatures.

9. The method of claim 1, wherein the alignment score is computed from a plurality of scoring algorithms.

10. The method of claim 9, wherein the plurality of scoring algorithms are selected from a group consisting essentially of: combinations of binary command scoring, command group scoring.

11. The method of claim 1, wherein the first alignment parameters and second alignment parameters result in a maximum alignment score for each of the at least one user.

12. The method of claim 1, wherein the alignment score is based on the first alignment parameters and the second alignment parameters with smallest penalties of inserting a gap into the sample signatures and the reference signatures.

13. The method of claim 1, wherein the patterns are selected from a group consisting essentially of: the dynamic threshold, the first alignment parameters, the second alignment parameters, the sample size, the reference sequences, the at least one profile, length of overlapped signature subsequence according to maximum number of inserted test gaps between the first alignment parameters and the second alignment parameters, and combinations thereof.

14. The method of claim 1, further comprising computing hit ratio percentage, false positive percentage and Maxion-Townsend score for each of the determined intrusion masquerade event.

15. The method of claim 1, wherein the updating patterns for each of the at least one active user comprises an inline update module utilized to update user signature patterns, the user lexicon list, and corresponding command categories.

16. The method of claim 1, wherein the updating patterns for each of the at least one active user comprises a long-term module utilized to update the alignment parameters, dynamic threshold values, scoring parameters, or the length of an overlapped signature subsequence according to maximum number of inserted test gaps.

17. A non-transitory computer-readable medium upon which is embodied a sequence of programmable instructions which, when executed by a processor, cause the processor to perform an intrusion masquerade detection method comprising:

receiving data from at least one user with an active session on a system;

receiving historical data for each of the at least one user;

applying an algorithm to the received data to build at least one profile for each of the at least one user, wherein the at least one profile comprises one or more sample signatures;

applying an algorithm to the received historical data to build at least one model for each of the at least one user, wherein said at least one model comprises one or more reference sequences;

identifying a dynamic threshold;

determining an alignment score between the sample signatures to the references signatures by comparing first alignment parameters from the sample signatures with second alignment parameters from the reference signatures;

determining an intrusion masquerade event based on the alignment score being greater than the identified dynamic threshold; and updating patterns for each of the at least one active user, wherein the first alignment parameters are selected from at least three of: optimal gap penalties, mismatch score, average optimal threshold, and maximum factor of test gaps, and wherein the second alignment parameters are selected from at least three of: optimal gap penalties, mismatch score, average optimal threshold, and maximum factor of test gap.

* * * * *